(12) United States Patent
Michel et al.

(10) Patent No.: US 6,200,916 B1
(45) Date of Patent: Mar. 13, 2001

(54) MANUFACTURING METHOD FOR A COLORED ZIRCONIA BASED ARTICLE IN PARTICULAR AN ORANGE/RED ARTICLE AND A COLORED ZIRCONIA BASED DECORATIVE ARTICLE OBTAINED IN ACCORDANCE WITH SUCH METHOD

(75) Inventors: Béatrice Michel, Brügg; Lionel Lemaire, Lausanne, both of (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/268,699

(22) Filed: Mar. 16, 1999

(30) Foreign Application Priority Data

Mar. 24, 1998 (CH) .................................................. 0691/98

(51) Int. Cl.⁷ .................................................. C04B 35/48
(52) U.S. Cl. .............................................. 501/32; 501/103
(58) Field of Search ........................................ 501/103, 32

(56) References Cited

U.S. PATENT DOCUMENTS 4,742,030   5/1988   Masaki et al. ........................ 501/105

FOREIGN PATENT DOCUMENTS 0 218 853    4/1987   (EP) .
0 700 796 A1 9/1995   (EP) .
62-059571  * 3/1987   (JP) .
06092638   * 4/1994   (JP) .

* cited by examiner

*Primary Examiner*—Paul Marcantoni
(74) *Attorney, Agent, or Firm*—Griffin & Szipl, P.C.

(57) ABSTRACT

The invention concerns a manufacturing method for an orange/red zirconia article characterised in that it includes the following steps:

forming a mixture including a zirconia powder, 3 to 20% in weight of a stabilising agent, 0.1% to 5% in weight of powders for forming a vitreous phase, including $SiO_2$, $Al_2O_3$ and $Y_2O_3$, 0.01% to 10% in weight of a copper oxide powder (CuO);

forming a second mixture including said first mixture and a binding agent;

forming a green body of the article from said second mixture;

sintering for at least thirty minutes at a temperature comprised between 1,350 and 1,500° C. in ambiant atmosphere, and annealing the desired article at a temperature comprised between 700° C. and 1,350° C. for a period of time comprised between 30 minutes and 20 hours in an inert or reducing atmosphere having an oxygen partial pressure comprised between $10^{-10}$ and 1 atmosphere, and polishing said sintered article.

9 Claims, No Drawings

MANUFACTURING METHOD FOR A COLORED ZIRCONIA BASED ARTICLE IN PARTICULAR AN ORANGE/RED ARTICLE AND A COLORED ZIRCONIA BASED DECORATIVE ARTICLE OBTAINED IN ACCORDANCE WITH SUCH METHOD

The invention concerns a manufacturing method for a coloured zirconia based article, in particular such an article having a colour comprised within the range from orange to red/bordeaux and made by sintering. For the sake of convenience such an article will be designated an orange/red article in the following description.

The invention also concerns an orange/red zirconia based decorative article in particular obtained from the above method.

Incorporating dyes or pigments such as cadmium sulphate (CdS), cadmium selenide (CdSe) and cadmium sulphoselenide in ceramic materials to obtain orange/red ceramic articles used, for example, for making enamels, glazes and receptacles for domestic use or floor coverings, is already known.

The use of this type of dye has numerous drawbacks as soon as one wishes to incorporate this type of dye in industrial ceramics, in particular sintered zirconia based materials.

Indeed, these dyes lack stability at high temperatures and only have their colouring properties up to 1,000 or 1,200° C. This greatly limits the use of this type of dye and in particular does not permit the realisation of sintered Zirconia based articles, the sintering temperatures of zirconia being in all cases higher than 1,100° C.

Moreover, the use of these types of dyes, which contain heavy metals, in articles intended to be in contact with the skin of a user, such as a watch case, if not legally prohibited, is at least strongly advised against.

Further, the dyes of this type which are available commercially have a granulometry which is not compatible with obtaining a homogenous mixture with zirconia powder.

A main object of the invention is thus to provide, on the one hand a manufacturing method for an orange/red sintered zirconia based article and on the other hand, such an article obtained in particular according to this method, this article having satisfactory mechanical properties while having an orange/red colouring at least to a depth of 5 mm.

The invention therefore concerns a manufacturing method for an orange/red zirconia based article characterised in that it includes the successive steps of:

forming a first mixture including a zirconia powder, 3 to 20% in weight of a stabilising agent selected from the group of oxides including yttrium oxide, magnesium oxide, cerium oxide and calcium oxide, 0.1% to 5% in weight of powders intended to form a vitreous phase, including silicon oxide, aluminium oxide and yttrium oxide, 0.01% to 10% in weight of a copper oxide powder;

forming a second mixture including said first mixture and a binding agent;

forming a granulated mixture by milling said second mixture;

forming a green body by giving said second granulated mixture the shape of the desired article;

sintering for at least thirty minutes at a temperature comprised between 1,350 and 1,500° C. in ambiant atmosphere, and annealing the desired article at a temperature comprised between 700° C. and 1,350° C. for a period of time comprised between 30 minutes and 20 hours in an inert or reducing atmosphere having an oxygen partial pressure comprised between $10^{-10}$ and 1 atmosphere, and polishing said sintered article.

By the incorporation of copper oxide (CuO) powder in the mixture to be sintered, the method of the invention allows a reduction in the sintering temperatures. The copper oxide also acts as one of the determining elements in the orange/red colouring which one wishes to give the article.

Indeed, the colour of the article after the sintering operation in the presence of CuO is green because of an accumulation of CuO in the +2 oxidation state at the grain boundaries. Then during a subsequent step of the method of the invention, called the annealing step, advantage is taken of the presence of CuO (oxidation state +2) to reduce it into $Cu_2O$ (oxidation state +1) or even to reduce a portion of the $Cu_2O$ into colloidal copper metal (oxidation state 0). After this annealing step, the article has a colour situated in the range going from orange yellow to red or bordeaux red as a function of the respective quantities of copper at the +2, +1, 0 oxidation states present at the grain boundaries. The colour of the copper oxide (CuO) corresponding to the +2 oxidation state is green, the colour of the copper oxide ($Cu_2O$) corresponding to the +1 oxidation state is yellow/orange and the colour of the colloidal copper metal (Cu) is red/bordeaux.

The respective quantities of copper oxides and copper, corresponding to the +2, +1, 0 oxidation states present at the grain boundaries are determined by the annealing conditions, more precisely by causing the oxygen partial pressure to vary within the atmosphere of the furnace where the annealing step take place.

According to one embodiment, the first mixture includes between 0.1 and 1% in weight of oxide powders for the vitreous phase and between 0.1 and 2% and, preferably, from 0.05 to 0.5% in weight of copper oxide powder ($Cu^{+2}O$).

The invention also concerns an orange/red zirconia based decorative article in particular obtained according to the method described hereinbefore, characterised in that it is formed of a part sintered from a moulded part including in substance a matrix of zirconium oxide, 3 to 20% in weight of at least one stabilising agent selected from the group of oxides including yttrium oxide, magnesium oxide, cerium oxide and calcium oxide, 0.1 to 5% in weight of a vitreous phase, including silicon oxide, aluminium oxide and yttrium oxide, and 0.01% to 10% in weight of copper oxides or a mixture of copper and copper oxides.

Such articles have the advantage of having intense luster or brilliance after polishing and are thus particularly suited for making decorative articles such as the constituent parts of watch cases.

Other features and advantages of the invention will appear in the light of the following description of an embodiment example of the method of the invention.

The manufacturing method of the invention which will now be described in detail is that which allows the realisation of an orange/red sintered zirconia based article whose appearance and mechanical properties are particularly suited for making constituent parts of wristwatches or for making any other decorative articles.

The orange/red zirconia article obtained according to this method includes 85 to 98.5% in weight of stabilised zirconia and the complement in weight i.e. 0.1 to 5% in weight of a vitreous phase made from a base of silicon oxide, aluminium oxide and yttrium oxide, and 0.01 to 10% in weight of copper oxides or a mixture of Cu and copper oxides.

Zirconia is stabilised in a conventional manner in tetragonal phase by at least one stabilising agent selected from the group of oxides including yttrium oxide, magnesium oxide, cerium oxide and calcium oxide, this stabilising agent being in a quantity of 3 to 20% in weight with respect to the zirconia.

In order to make this article, according to an implementation example of the invention one proceeds in the following manner:

985.5 grams of stabilised zirconia powder with 5.3% in weight of yttrium oxide is weighed. The powder used has an average granulometry of the micrometer order of magnitude, typically 0.5 micrometer. Such a powder is sold under the reference TZ-3Y by the Tosoh Corporation, Japan.

Next, 10 grams of a mixture of silicon oxide, aluminium oxide and yttrium oxide powder, intended to form a vitreous phase during subsequent sintering, is weighed.

Preferably, the vitreous phase includes substantially equal quantities in weight of each of the aforementioned oxides, and even more preferably, the mixture includes 29% in weight of silicon oxide, 29% in weight of aluminium oxide and 42% in weight of yttrium oxide.

The silicon powder used has an average granulometry of less than a micrometer, typically 40 nanometers, and is sold under the name Aerosil OX50 by the Cerdec company, Germany.

The aluminium oxide powder used has an average granulometry of the micrometer order of magnitude, typically 0.5 micrometer and is sold under the name CR 30 by the Baikowski company, France.

The yttrium oxide powder used has an average granulometry of the micrometer order of magnitude, typically of 2.4 micrometers and is sold under the reference No. 95 834 by the Fluka company, Germany.

Finally, 4.5 grams of copper oxide ($Cu^{2+}O$) is weighed, the powder used has a granulometry of the micrometer order of magnitude, typically 1.7 micrometer and is sold under the reference No 61 202 by Fluka, Germany.

It will be noted that all these powders must preferably have a purity greater than 99.5%.

Once weighing of the powders is complete, all of said powders are mixed and homogenised in an aqueous solution. In the final phase of homogenisation, around 50 grams of a binding agent is added, for example a polyvinyl alcohol.

The mixture is then dried for example in a conventional atomiser.

The granule thus obtained is sieved to 315 micrometers.

The sieved granule is then pressed into a mould having the shape of the article which one wishes to obtain in order to form a green body thereof.

The article in its general quasi final shape is placed in a sintering furnace. It will be noted in this regard that the sintering can be effected in ambiant atmosphere The article is then heated in a first phase at a rate of 30° per hour up to around 1,000° C., then in a second phase at a rate of 500° per hour up to a temperature of 1,350° C. The article is kept at this temperature for at least thirty minutes and preferably for one hour.

It will be noted that the sintering can of course be effected at any other temperature higher than or equal to 1,100° C. and lower than 1,600° C.

During sintering, the silicon oxide, aluminium oxide and yttrium oxide form a vitreous phase which is concentrated with the copper oxide at the +2 oxidation state at the grain boundaries, which gives the article a green colour after sintering.

It will be noted that the presence of the copper oxide advantageously lowers the sintering temperature.

After this sintering step, the article is placed in an annealing furnace in which it is possible to select the atmosphere. The desired article can be annealed either in an inert atmosphere such as an argon (Ar) or nitrogen ($N_2$) atmosphere or in a hydrogen atmosphere ($H_2$) including a mixture of nitrogen and hydrogen ($N_2/H_2$).

During this annealing step, the oxygen partial pressure in the furnace is comprised between $10^{-10}$ and 1 atmosphere, the annealing temperature is comprised between 700° C. and 1,250° C. and the annealing time is generally comprised between 30 minutes and 20 hours. According to a preferred implementation of the method of the invention, the oxygen partial pressure is comprised between $10^{-6}$ and $10^{-2}$ atmosphere, the annealing temperature is comprised between 900 and 1,150° C. and the annealing time is comprised between 8 and 15 hours. It will be understood that the depth of colouring inside the article varies proportionally with the annealing time.

The colour of the article obtained after the annealing operation is orange yellow or red or has a shade of colour between yellow orange and red as a function of the annealing conditions.

The article is then cooled then machined to obtain a shape suited to the final use thereof. It will be noted that the colouring is performed so well deep into the article that the machining of the article in no way alters the colour thereof.

Finally, the article is polished for example using a diamond paste, the article thus obtained has a brilliant yellow orange or red appearance or a shade comprised between these colours as a function of the annealing conditions so that it has attractive and interesting aesthetic features, in particular for applications within the field of watchmaking.

According to another embodiment example of the method of the invention, the previously described operating process was followed to form watch bracelet links which are 20 mm long, 7 mm wide and 3 mm thick. In this example the following composition was used: 0.26% in weight of $SiO_2$, 0.26% in weight of $Al_2O_3$, 0.38% in weight of $Y_2O_3$ in vitreous phase, 0.45% in weight of CuO, and the remainder, i.e. 98.65% in weight of stabilised $ZrO_2$. Once configured in their desired final shape, the links were sintered in ambient atmosphere for 2 hours at 1,400° C., These links were then annealed for 2 hours at 1,200° C. in a Formiergas atmosphere including 8% $H_2$ and 90% $N_2$. The links were cooled then mirror polished.

The links obtained had a brilliant bordeaux appearance. It was also observed, after breaking a link, that the colouring was effected deep into the article According to another embodiment example of the method of the invention, the previously described operating process was followed for making circular watch middle parts which are 30 mm in diameter and 5 mm thick. In this example, the following composition was used: 0.26% in weight of $SiO_2$, 0.26% in weight of $Al_2O_3$, 0.38% in weight of $Y_2O_3$ in vitreous phase, 0.30% in weight of CuO, and the remainder, i.e., 98.8% in weight of stabilised $ZrO_2$. Once configured in their desired final shape, the middle parts were sintered in ambiant atmosphere for 2 hours at 1,550° C. These middle parts were then annealed for 2 hours at 1,000° C. in a Formiergas atmosphere including 8% $H_2$ and 90% $N_2$. The middle parts were cooled, then mirror polished. The middle parts obtained had a brilliant bordeaux appearance.

What is claimed is:

1. A manufacturing method for an orange/red zirconia based article including the successive steps of:

forming a first mixture including a zirconia powder, 3 to 20% in weight of a stabilising agent selected from the group of oxides consisting of yttrium oxide, magnesium oxide, cerium oxide and calcium oxide, 0.1% to 5% in weight of powders for forming a vitreous phase, selected from the group consisting of silicon oxide, aluminum oxide and yttrium oxide, 0.01% to 10% in weight of a copper oxide powder (CuO);

forming a second mixture including said first mixture and a binding agent;

forming a granulated mixture by milling said second mixture;

forming a green body by giving said second granulated mixture the shape of the article;

sintering said green body for at least thirty minutes at a temperature between 1,350 and 1,500° C. in ambient atmosphere, so as to form a vitreous phase comprising silicon oxide, aluminum oxide and yttrium oxide to form a sintered article, and annealing the sintered article at a temperature between 700° C. and 1,350° C. for a period of time between 30 minutes and 20 hours in an inert or reducing atmosphere having an oxygen partial pressure between $10^{-10}$ and 1 atmosphere to produce an annealed article, and polishing said annealed article.

2. A method according to claim 1, wherein the first mixture includes 0.1% to 1% in weight of powders for forming a vitreous phase.

3. A method according to claim 1, wherein the powders for forming a vitreous phase include substantially equal quantities in weight of each of silicon oxide, aluminum oxide and yttrium oxide, and preferably 29% in weight of silicon oxide, 29% in weight of aluminum oxide and 42% in weight of yttrium oxide.

4. A method according to claim 1, wherein the first mixture includes 0.1% to 2% in weight of copper oxide powder.

5. A method according to claim 1, wherein the stabilising agent is yttrium oxide.

6. A method according to claim 1, wherein the annealing temperature is between 900 and 1,150° C. and wherein the inert or reducing atmosphere has an oxygen partial pressure between $10^{-6}$ and $10^{-2}$ atmosphere.

7. An orange/red zirconia based decorative article formed of a part sintered from a moulded part including a matrix of zirconium oxide, 3 to 20% in weight of at least one stabilising agent selected from the group consisting of oxides including yttrium oxide, magnesium oxide, cerium oxide and calcium oxide, 0.1 to 5% in weight of a vitreous phase, including silicon oxide, aluminum oxide and yttrium oxide, and 0.01% to 10% in weight of copper oxides or a mixture of copper and copper oxides.

8. An orange/red zirconia based decorative article, formed of a part sintered from a moulded part including a matrix of zirconium oxide, 3 to 20% in weight of at least one stabilizing agent selected from the group of oxides consisting of yttrium oxide, magnesium oxide, cerium oxide and calcium oxide, 0.1 to 5% in weight of a vitreous phase, including silicon oxide, aluminum oxide and yttrium oxide, and 0.01% to 10% in weight of copper oxides or a mixture of copper and copper oxides, said decorative article being obtained by a method comprising the steps of:

forming a first mixture including a zirconia powder, 3 to 20% in weight of a stabilizing agent selected from the group of oxides consisting of yttrium oxide, magnesium oxide, cerium oxide and calcium oxide, 0.1% to 5% in weight of powders for forming a vitreous phase, including silicon oxide, aluminum oxide and yttrium oxide, 0.1% to 10% in weight of a copper oxide powder (CuO);

forming a second mixture including said first mixture and binding agent;

forming a granulated mixture by milling said second mixture;

forming a green body by giving said second granulated mixture the shape of the article;

sintering said green body for at least thirty minutes at a temperature comprised between 1,350 and 1,500° C. in ambient temperature, so as to form a vitreous phase comprising silicon oxide, aluminum oxide and yttrium oxide to form a sintered article, and annealing the sintered article at a temperature between 700° C. and 1,350° C. for a period of time between 30 minutes and 20 hours in an inert or reducing atmosphere having an oxygen partial pressure between $10^{-10}$ and 1 atmosphere to produce an annealed article, and polishing said annealed article.

9. A method according to claim 1, wherein the first mixture includes 0.05% to 0.5% in weight of copper oxide powder.

* * * * *